United States Patent
Hong et al.

(10) Patent No.: US 7,259,475 B2
(45) Date of Patent: Aug. 21, 2007

(54) UNINTERRUPTIBLE POWER SUPPLY FOR THE BACKUP OF AC-POWER SUPPLY

(75) Inventors: Myoung-shin Hong, Kyunggi (KR); Donghwan Jang, Kyunggi (KR); Whanjin Roh, Seoul (KR); Jongho Park, Seoul (KR); Soonnam Cho, Kyunggi (KR)

(73) Assignee: Eppscore Co., Ltd., Kyunggi-do (KR)

( * ) Notice: Subject to any disclaimer, the term of this patent is extended or adjusted under 35 U.S.C. 154(b) by 0 days.

(21) Appl. No.: 10/563,522

(22) PCT Filed: Jul. 3, 2004

(86) PCT No.: PCT/KR2004/001648

§ 371 (c)(1),
(2), (4) Date: Jan. 3, 2006

(87) PCT Pub. No.: WO2005/004306

PCT Pub. Date: Jan. 13, 2005

(65) Prior Publication Data

US 2006/0170289 A1 Aug. 3, 2006

(30) Foreign Application Priority Data

Jul. 3, 2003 (KR) .................. 10-2003-0044952

(51) Int. Cl.
*H02J 7/00* (2006.01)
(52) U.S. Cl. ........................................... 307/64
(58) Field of Classification Search ............ 307/64
See application file for complete search history.

(56) References Cited

U.S. PATENT DOCUMENTS 6,487,096 B1 * 11/2002 Gilbreth et al. .............. 363/35

2003/0080622 A1 * 5/2003 Koenig .................. 307/64

FOREIGN PATENT DOCUMENTS

| JP | 2001-061238 A | 3/2001 |
| JP | 2001-128390 A | 5/2001 |
| JP | 2001-286078 A | 10/2001 |
| JP | 2002-034179 A | 1/2002 |
| WO | WO98/59413 | 12/1998 |

* cited by examiner

*Primary Examiner*—Robert L. Deberadinis
(74) *Attorney, Agent, or Firm*—Hoffmann & Baron, LLP

(57) ABSTRACT

The present invention relates to an uninterruptible power supply, more specifically, to an uninterruptible power supply for the backup of AC-power supply which comprises an electric double layer capacitor as an energy storage device. The uninterruptible power supply according to the present invention comprises an AC power source, a AC/DC converter which converts an AC input from the AC power source into an DC power, an energy storage device which stores an extra electric energy and a DC/AC inverter which converts DC input from the energy storage device into AC power and supplies the AC power to an output load at a power interruption, wherein the energy storage device is an electric double layer capacitor and a ratio of charging voltage of the electric double layer capacitor to a minimum operating voltage of the DC/AC inverter is adjusted to 1.3 times or higher. The uninterruptible power supply has highly enhanced energy efficiency and power backup time, compared even to the conventional DC power backup system such that efficient power backup can be achieved.

3 Claims, 5 Drawing Sheets

(a)

(b)

(a)

(b)

UNINTERRUPTIBLE POWER SUPPLY FOR THE BACKUP OF AC-POWER SUPPLY

TECHNICAL FIELD OF THE INVENTION

The present invention relates to an uninterruptible power supply. More specifically, the present invention relates to an uninterruptible power supply for the backup of AC-power supply which comprises an electric double layer capacitor as an energy storage device.

BACKGROUND OF THE INVENTION

Uninterruptible power supply is an apparatus which supplies stable power to productive facilities at a momentary power interruption. More specifically, as shown in FIG. 1, the uninterruptible power supply (2) stores an extra electric energy from a power source (1) into an energy storage device (3) and supplies stable power to an output load (4) at a momentary power interruption.

Up to now, representative examples of the energy storage device of the uninterruptible power supply include a battery and an electric double layer capacitor. While the battery has a high energy density of 20-120 Wh/kg, it suffers from a low discharge density of 50-250 W/kg and a low cycle life of no more than 500 cycles. Although the uninterruptible power supply comprising the battery as an energy storage device has an advantage of elongated power supply due to the high energy density, it suffers from a disadvantage that regular maintenances caused by low life characteristics is required. To the contrary, the electric double layer capacitor has a high output density of 1000~2000 W/kg and a semi-permanent cycle life, even though it has a low energy density of 1~5 W/kg. For these reasons, the uninterruptible power supply comprising the electric double layer capacitor as an energy storage device is adequate for the backup of a power supply at the momentary power interruption.

The conventional uninterruptible power supply comprising the electric double layer capacitor as an energy storage device can be classified into two categories: an AC power backup system and a DC power backup system. The DC power backup system backups a DC electronic device installed within an output load to which the electric double layer capacitor is connected. Referring to FIG. 2, an AC input from an AC power source (1) is converted into DC power by the action of an AC/DC converter (5), and then an extra electric energy is stored into an electric double layer capacitor (3). At the temporary power interruption, the electric double layer capacitor (3) supplies the extra electric energy to the DC electronic device in a form of direct current in order to backup the device. Such a DC power backup system has a simple circuit constitution so that it is advantageous in terms of compactness and lightness. However, the DC power backup system can not applicable to the output load such as motors which requires alternative current as a power source. Further, the DC power backup system back-ups only the device positioned within the output load. Therefore, the system can not applicable to simultaneous backups of multiple output loads.

The AC power backup system supplies AC power to an output load. An AC input from an AC power source is converted into a DC power by the combinational action of a transformer and an AC/DC converter and then stored into the electric double layer capacitor. At a power interruption, the DC output from the electric double layer capacitor is converted into AC current by the action of a DC/AC inverter and then the AC power is supplied to the output load. This system supplies the same power with a power source such that it can backup multiple output loads at the same time. And the system can be applicable to the backup of the motors which requires AC power. Referring FIG. 3, an AC input from an AC power source (1) is converted into DC power by the combinational action of a transformer (8) and an AC/DC converter (5) and then, an extra electric energy is stored into an electric double layer capacitor (6). At the temporary power interruption, DC output from the electric double layer capacitor (6) is transferred into AC power by the action of a DC/AC inverter (9) and then supplied to an output load (4). Japanese unexamined patent publication 2001-061238 discloses an exemplary embodiment of the AC power backup system. Such an AC power backup system is a bulky and heavy system because of the transformer and the DC/AC inverter. Further, it has a low efficiency because of energy loss in the DC/AC inverter, which additionally increases the volume and weight of the system.

DISCLOSURE

Technical Problem

In order to solve the problem of the conventional uninterruptible power supply for the backup of AC-power, an object of the present invention is to enhance energy efficiency and increase power backup time of the uninterruptible power supply.

Another object of the present invention is to provide an uninterruptible power supply for the backup of AC-power having reduced volume and weight by establishing maximized adjustment of the charging voltage.

Technical Solution

According to a preferred embodiment of the present invention, there is provided an uninterruptible power supply for the backup of AC-power which converts an AC input from the AC power source into an DC power with a AC/DC converter and stores an extra electric energy into an energy storage device, and at a power interruption, converts a DC input from the energy storage device into an AC power with a DC/AC inverter and supplies the AC power to an output load, wherein the energy storage device is an electric double layer capacitor and a ratio of charging voltage of the electric double layer capacitor to minimum operating voltage of the DC/AC inverter is adjusted to 1.3 times or higher.

According to another preferred embodiment of the present invention, there is provided an uninterruptible power supply for the backup of AC-power which converts an AC input from the AC power source into an DC power with a AC/DC converter and stores an extra electric energy into an energy storage device, and at a power interruption, converts a DC input from the energy storage device into an AC power with a DC/AC inverter and supplies the AC power to an output load, wherein the energy storage device is an electric double layer capacitor, a ratio of charging voltage of the electric double layer capacitor to minimum operating voltage of the DC/AC inverter is adjusted to 1.3 times or higher, and the charging voltage of the electric double layer capacitor is adjusted to output voltage of the AC/DC converter such that a transformer is not required.

Advantageous Effect

The uninterruptible power supply for the backup of AC-power according to the present invention provides highly enhanced energy efficiency and power backup time by adjusting a ratio of charging voltage of the electric double layer capacitor to minimum operating voltage of the DC/AC to 1.3 times or higher. Further, by sufficiently elevating the charging voltage of the electric double layer capacitor to output voltage of the AC/DC converter, a transformer required in the conventional uninterruptible power supply is not necessary. This highly reduces the volume and the weight of the uninterruptible power supply. Therefore, the uninterruptible power supply according to the present invention can be advantageously applicable to the power backup of no more than 30 sec, more preferably 2~5 sec.

DESCRIPTION OF REFERENCE NUMERALS

Figure 1:
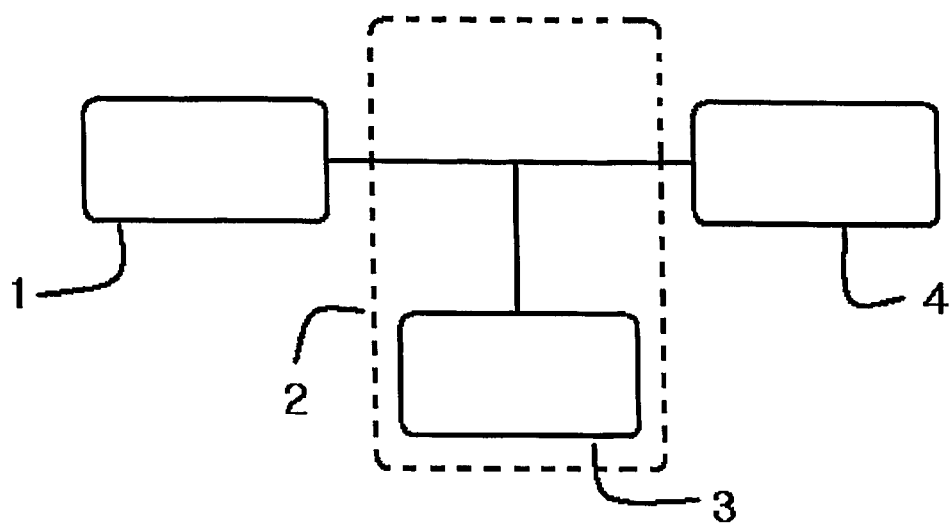
FIG. 1 is an outlined block diagram illustrating an uninterruptible power supply.
Figure 2:
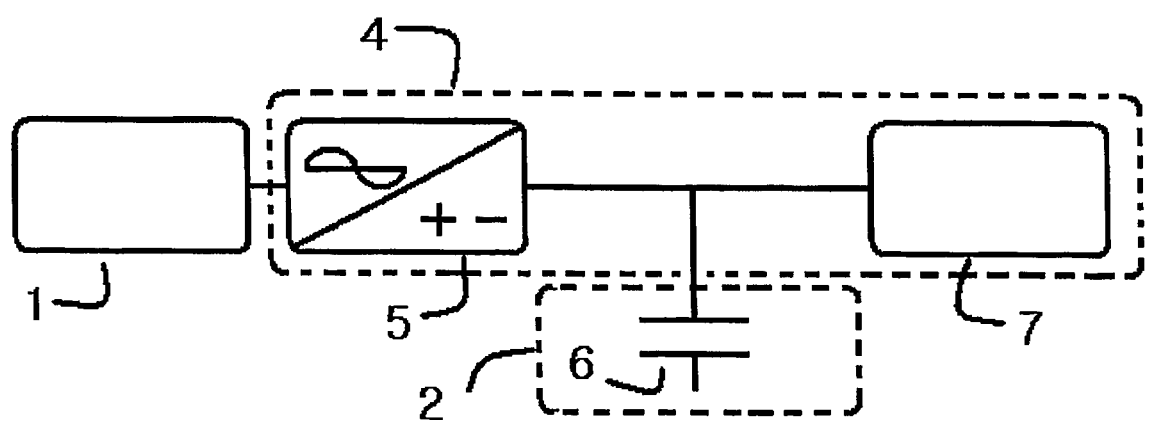
FIG. 2 is an outlined block diagram illustrating an uninterruptible power supply for the backup of DC-power.
Figure 3:
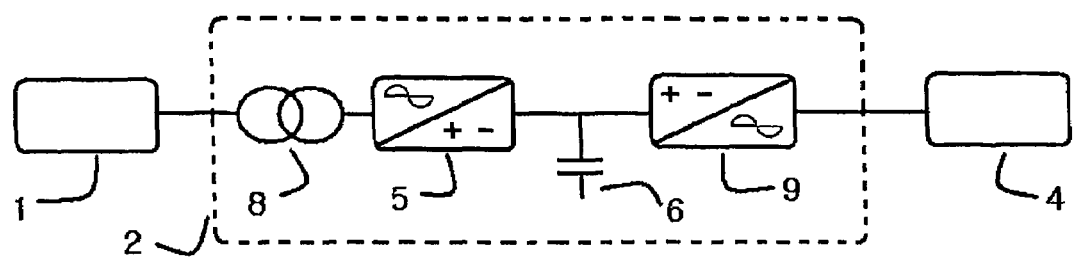
FIG. 3 is an outlined block diagram illustrating an uninterruptible power supply for the backup of AC-power.

1: AC input power source 2: Uninterruptible power supply
3: Energy storage device 4: Output load
5: AC/DC converter 6: Electric double layer capacitor
7: Electrical device 8: Transformer
9: DC/AC inverter 10: semiconductor diode Mode for Invention In the following, the present invention will be more fully illustrated.

As described in the above, the AC power backup system suffers from low energy efficiency and requires the electric double layer capacitor with heavy volume and weight. The low energy efficiency is attributed to energy loss caused in the DC/AC inverter, power consumptions in the operation of the inverter and other components. In general, it was well known that about 20% of energy loss takes place in the typical uninterruptible power supplies. To the contrary, the DC power backup system has a simple circuit constitution and the DC power stored in the electric double layer capacitor directly backups electronic devices. For these reasons, energy loss in a power backup can be ignored.

The present inventor found that higher discharge efficiency than the DC power backup system can be achievable by adjusting charging voltage of the electric double layer capacitor to 1.3 times or higher than the minimum operating voltage of the DC/AC inverter, and that the increased energy efficiency offsets energy loss resulted from energy consumption of circuit components. Therefore, there is provided an uninterruptible power supply for the backup of AC-power in which charging voltage of the electric double layer capacitor is adjusted to 1.3 times or higher relative to minimum operating voltage of the DC/AC inverter, which overcomes the disadvantages of the conventional AC power backup system.

Figure 6:
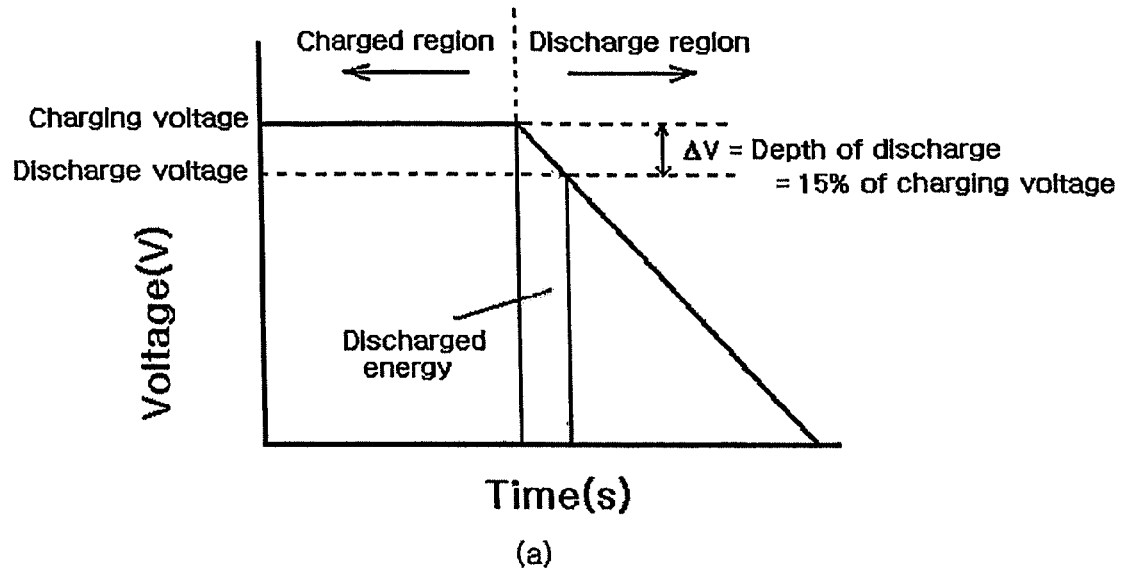
FIG. 6 is a graph showing a variance of discharge efficiency dependent upon depth of discharge of the electric double layer capacitor.
Figure 6:
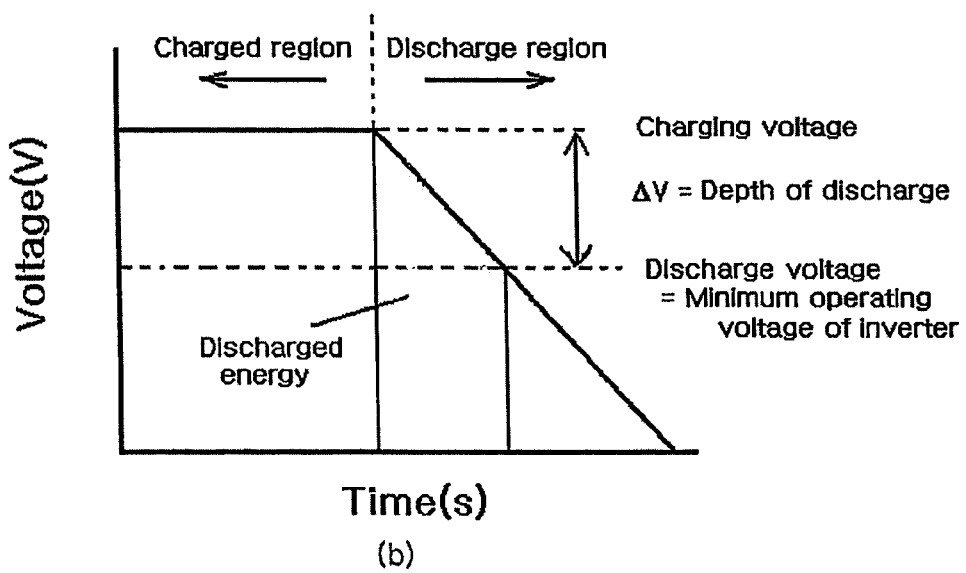

More detailed explanation is as follows: the electric double layer capacitor used in the uninterruptible power supply has a tendency that discharge voltage thereof successively decreases at a constant slope, as shown in FIG. 6. That is, the electric double layer capacitor does not supply constant voltage to an output load. This means that the power backup from the electric double layer capacitor to the output load is possible only to the operating voltage of the output load. That is, the energy stored in the electric double layer capacitor is not fully used, and the energy below the operating voltage is useless. This is represented by a mathematical formula 1:

Mathematical Formula 1

$$D_{Efficiency} = \frac{\frac{1}{2}CV_{charge}^2 - \frac{1}{2}CV_{discharge}^2}{\frac{1}{2}CV_{charge}^2} \times 100(\%)$$

(wherein, $D_{efficiency}$, C, $V_{charge}$ and $V_{discharge}$ represent discharge efficiency, capacitance, charging voltage and discharge voltage, respectively.)

As shown in the mathematical formula 1, the discharge efficiency of the electric double layer capacitor is dependent upon depth of discharge ($\Delta V = V_{charge} - V_{discharge}$). As the depth of discharge is higher, higher discharge efficiency can be achievable. The depth of discharge upon which discharge efficiency is dependent is different between the DC power backup system and the AC power backup system, as shown in FIG. 6. In the DC power backup system, the depth of discharge is limited to 15% of charging voltage, which is shown in FIG. 6a. The reason is that below 15% of charging voltage belongs to a sags region which may result in erroneous working of the electronic devices. For the DC power backup system, the theoretical discharge efficiency calculated from the mathematical formula 1 is 27.8%. This means that of the energy stored in the electric double layer capacitor, 27.8% can be used for the backup of the electronic device.

Figure 7:
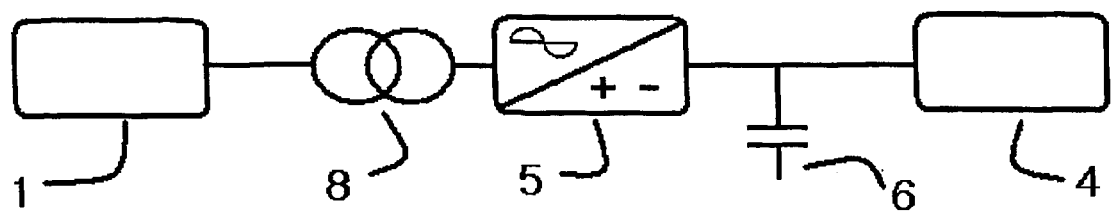
FIG. 7 is an outlined block diagram illustrating a specific embodiment of the conventional uninterruptible power supply for the backup of DC-power according to Comparative Example 2.

According to the test result of the discharge efficiency using the circuit constitution shown in FIG. 7 showed that real discharge efficiency was about 16%, which was quite lower than from the theoretical discharge efficiency. It is believed that such a decrease is attributed to IR drop which takes place in a real operation of the uninterruptible power supply.

To the contrary, in the AC power backup system shown in FIG. 6b, the depth of discharge of the electric double layer capacitor is dependent upon both of the charging voltage of the electric double layer capacitor and the minimum operating voltage of the DC/AC inverter, wherein the minimum operating voltage of the DC/AC inverter means a voltage required for stable conversion of DC power to AC power. The DC/AC inverter can generate AC power with constant voltage within a range between the minimum operating voltage and a maximum operating voltage. Thus, the electric double layer capacitor can be discharged to a level of the minimum operating voltage of the DC/AC inverter. As a result, the depth of discharge of the AC power backup system is determined by the charging voltage of the electric double layer capacitor and the minimum operating voltage of the DC/AC inverter.

Figure 4:
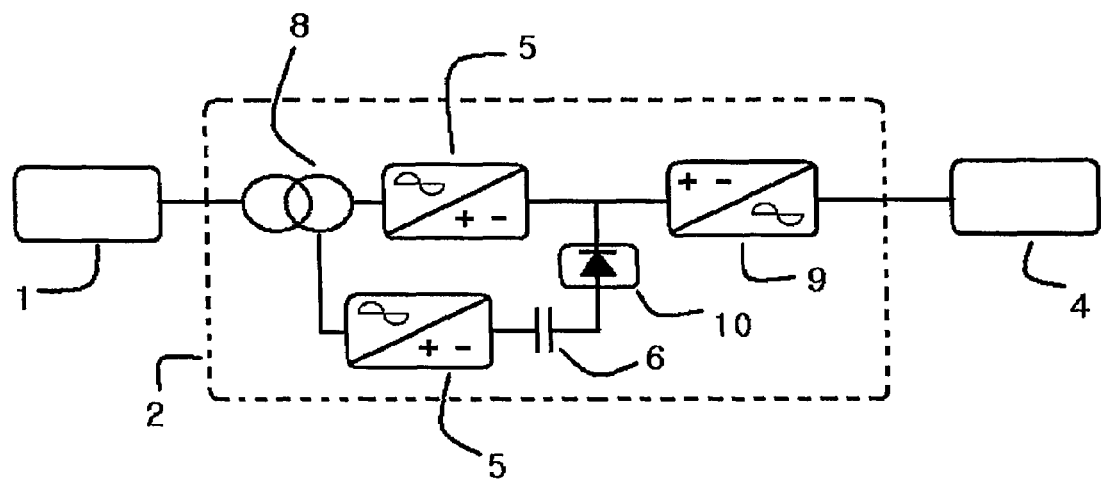
FIG. 4 is an outlined block diagram illustrating a preferred embodiment of the uninterruptible power supply for the backup of AC-power, in accordance with the present invention.

The present inventors tested the real discharge efficiency and power backup time of the uninterruptible power supply for the AC power backup system shown in FIG. 4. The real discharge efficiency was shown to be 9.4%, in a case that the ratio of the charging voltage of the electric double layer capacitor to the minimum operating voltage of the DC/AC inverter is adjusted to 1.2, which is much lower than that of the DC power backup system. To the contrary, the real discharge efficiency was shown to be 22.8%, in a case that the ratio of the charging voltage of the electric double layer capacitor to the minimum operating voltage of the DC/AC inverter is adjusted to 1.3, which is even higher than that of the DC power backup system. Further, the power backup time was shown to be 1.4 sec at the ratio of 1.3, while the power backup time was shown to be 0.54 sec at the ratio of 1.2. The power backup time was highly increased by elevating the ratio from 1.2 to 1.3.

Those results revealed that in order to achieve higher discharge efficiency than that of the DC power backup system, the ratio of the charging voltage of the electric double layer capacitor to the minimum operating voltage of the DC/AC inverter should be adjusted to 1.3 or higher. Under this situation, the electric double layer capacitor used in AC power backup system can achieve backup of the system with lower energy and in an elongated time, and with reduced volume and weight.

In a meanwhile, the conventional AC power backup system suffered from a disadvantage that the circuit components had heavy volume and weight. Among them, the transformer used in the AC power backup system occupied 35~40 wt % and 15~20 vol %, relative to the total backup system. In order to solve this disadvantage, the charging voltage of the electric double layer capacitor is adjusted to an output voltage of the AC/DC converter. This avoids use of the transformer required in the conventional AC power backup system. That is, by adjusting the charging voltage of the electric double layer capacitor to the output voltage of the AC/DC converter, the transformer for use in charge can be omitted. This highly reduces the volume and weight of the system and gives simple circuit constitution. Herein, the upper limit of the charging voltage of the electrical double layer is determined by the maximum operating voltage (withstand voltage) of the inverter.

In the following, the present invention will be more fully illustrated referring to the Examples, but it should not be construed that the scope of the present invention is limited thereto.

PREPARATION EXAMPLE

Preparation of an Electric Double Layer Capacitor

An electric double layer capacitor was prepared according to the procedure well known in the art: YP 10 85 wt as an activated carbon (available from Gurea, JP), acetylene black 12 wt as a conductive material were mixed, and then CMC (carboxy methyl cellulose) 3 wt as a binder was added to the mixture, and water as a solvent was added thereto. The obtained suspension was homogeneously mixed for 12 h. The obtained coating suspension was coated on aluminum current collectors and dried under vacuum for 12 h at 120° C. The prepared activated carbon electrons were successively deposited in combination with a rayon fiber, and then 1M $Et_4NBF_4$ electrolyte solution dissolved in acetonitrile was used in order to prepare unit cell of the electric double layer capacitor. The prepared unit cell of the electric double layer capacitor had withstand voltage of 2.5 V and capacitance of 50 F. Energy density was 2.80 Wh/kg.

Example 1

Through 96 series—5 parallel connections of the unit cells prepared in the above, an electric double layer capacitor module having total withstand voltage of 240 V and total capacitance of 2.6 F was prepared. Using the module, an on-line circuit shown in FIG. 4 was prepared. As a DC/AC inverter (9), IGBT (insulated gate bipolar transistor) having a minimum operating voltage of about 167 V was used. AC voltage from an AC power source (1) was 208 V. With a transformer (8) and an AC/DC converter (5), charging voltage of an electric double layer capacitor (6) was adjusted to 217 V, which is 1.3 times of the minimum operating voltage of the DC/AC inverter (9).

Example 2

Figure 5:
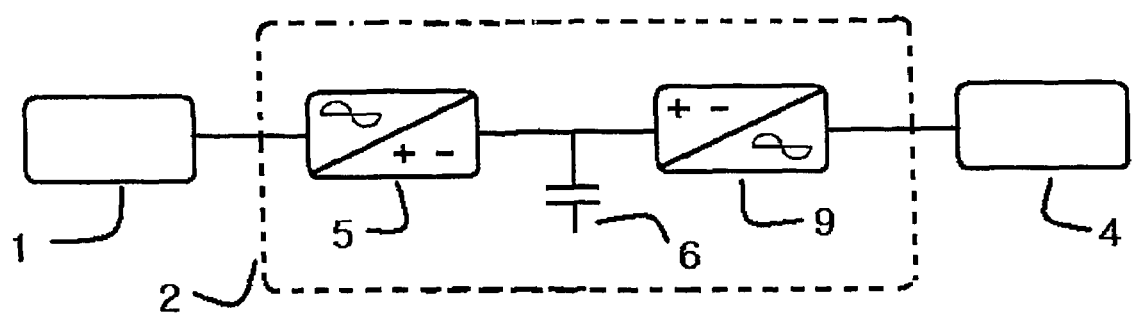
FIG. 5 is an outlined block diagram illustrating another preferred embodiment of the uninterruptible power supply for the backup of AC-power, in accordance with the present invention.

Through 135 series—4 parallel connections of the unit cells prepared in the above, an electric double layer capacitor module having total withstand voltage of 337.5 V and total capacitance of 1.48 F was prepared. Using the module, a circuit shown in FIG. 5 was prepared. As a DC/AC inverter (9), IGBT (insulated gate bipolar transistor) having a minimum operating voltage of about 167 V was used. AC voltage from an AC power source (1) was 208 V. With a transformer (8) and an AC/DC converter (5), charging voltage of an electric double layer capacitor (6) was adjusted to 294 V (=208*$\sqrt{2}$), which is $\sqrt{2}$ times of the output voltage of the AC power source (1).

Comparative Example 1

For the purpose of comparison, an uninterruptible power supply having the same constitution with that of Example 1 except that the charging voltage of the electrical double layer capacity having 88 series—5 parallel connections (withstand voltage: 220 V, capacitance: 2.84 F) was adjusted to 200 V.

Comparative Example 2

For the purpose of comparison, an uninterruptible power supply for the backup of DC power was constructed as shown in FIG. 7. Through 96 series—5 parallel connections of the unit cells, an electric double layer capacitor having total withstand voltage of 240 V and total capacitance of 2.6 F was prepared. With a transformer (8) and an AC/DC converter (5), charging voltage of the electric double layer capacitor (6) was adjusted to 217 V.

Experimental Example 1

The uninterruptible power supplies prepared in the Examples and the Comparative Examples was positioned between an AC power source (1) and a 10 kW resistant body as an output load. The characteristics thereof were shown in Table 1:

TABLE 1

| | Characteristics of the electric double layer capacitor | | |
| --- | --- | --- | --- |
| | Charging voltage (V) | Withstand voltage (V) | Capacitance (F) |
| Example 1 | 217 | 240 | 2.60 |
| Example 2 | 294 | 337.5 | 1.48 |
| Comparative Example 1 | 200 | 220 | 2.84 |
| Comparative Example 2 | 217 | 240 | 2.60 |

Using the uninterruptible power supplies prepared in the Examples and the Comparative Examples, a power backup time and an energy supplied for the power backup were measured with an oscilloscope at a power interruption, and results thereof were summarized in Table 2:

TABLE 2

| | Charging voltage/ discharge voltage | Energy stored in the EDLC (Wh) | Power backup time (sec) | Energy supplied for the power backup (Wh) | Energy efficiency (%) |
|---|---|---|---|---|---|
| Example 1 | 1.3 | 17.0 | 1.40 | 3.89 | 22.8 |
| Example 2 | 1.73 | 17.8 | 3.88 | 7.50 | 60.5 |
| Comparative Example 1 | 1.2 | 15.8 | 0.54 | 1.39 | 9.4 |
| Comparative Example 2 | 1.18 | 17.0 | 1.00 | 2.70 | 16.0 |

As shown in Table 2, the power backup time according to the AC power backup system of the Comparative Example 1 was shown to be 0.54 sec, which was 0.5 times relative to the DC power backup system of the Comparative Example 2 having the same energy capability of the electric double layer capacitor. To the contrary, the power backup time according to the AC power backup system of the Example 1 was shown to be 1.4 sec, which is 1.4 times higher than that of the DC power backup system of the Comparative Example 2 having the same energy capability of the electric double layer capacitor. In addition, the power backup time according to the AC power backup system of the Example 2 was shown to 3.88 times higher than that of the DC power backup system of the Comparative Example 2. Those results indicated that highly enhanced energy efficiency were achieved, by adjusting the ratio of the charging voltage of the electric double layer capacitor to the minimum operating voltage of the DC/AC inverter to 1.3 times or higher compared to the Comparative Examples 1 and 2.

Experimental Example 2

Using the circuit constitution according to Example 1, energy efficiencies were measured under various ratios of the charging voltage of the electric double layer capacitor to the minimum operating voltage of the DC/AC inverter. The results thereof were summarized in Table 3:

As shown in the Table 3, when the ratio of the charging voltage of the electric double layer capacitor to the discharge voltage of the DC/AC inverter is 1.3 times or higher, highly enhanced energy efficiency can be attainable.

The invention claimed is:

1. An uninterruptible power supply for the backup of AC-power which converts an AC input from the AC power source into an DC power with a AC/DC converter and stores an extra electric energy into an energy storage device, and at a power interruption, converts a DC input from the energy storage device into an AC power with a DC/AC inverter and supplies the AC power to an output load, wherein the energy storage device is an electric double layer capacitor and a ratio of charging voltage of the electric double layer capacitor to a minimum operating voltage of the DC/AC inverter is adjusted to 1.3 times or higher.

2. The uninterruptible power supply as set forth in claim 1, wherein the charging voltage of the electric double layer capacitor is adjusted to output voltage of the AC/DC converter such that a transformer is not required.

3. The uninterruptible power supply as set forth in claim 1, having no more than 30 sec of power backup time.

* * * * *

TABLE 3

| | Characteristics of the electric double layer capacitor | | | | | | |
|---|---|---|---|---|---|---|---|
| Charging voltage/ discharge voltage | Circuit arrangement (series × parallel) | Charging voltage | Withstand voltage | Capacitance | Energy density | Power backup time (sec) | Energy efficiency (%) |
| 1.1 | 80 × 8 | 183 | 200 | 5.00 | 23.26 | 0.07 | 0.8 |
| 1.2 | 88 × 5 | 200 | 220 | 2.84 | 15.78 | 0.54 | 9.4 |
| 1.3 | 96 × 5 | 217 | 240 | 2.60 | 17.03 | 1.4 | 22.8 |
| 1.4 | 103 × 5 | 233.8 | 258 | 2.42 | 18.42 | 2.27 | 35.0 |
| 1.5 | 110 × 5 | 250.5 | 270 | 2.27 | 19.80 | 3.13 | 43.9 |
| 1.6 | 118 × 4 | 267.3 | 295 | 1.69 | 16.81 | 2.98 | 49.3 |